United States Patent [19]

Yamashita

[11] Patent Number: 5,294,995

[45] Date of Patent: Mar. 15, 1994

[54] VIDEO DISC REPRODUCING APPARATUS WITH PHASE SHIFTER TO ELIMINATE INTER-MODULATION DISTORTION BETWEEN REPRODUCED AUDIO AND VIDEO SIGNALS

[75] Inventor: Noriyuki Yamashita, Tokyo, Japan

[73] Assignee: Sony Corporation, Tokyo, Japan

[21] Appl. No.: 948,442

[22] Filed: Sep. 22, 1992

[30] Foreign Application Priority Data

Sep. 30, 1991 [JP] Japan ................... 3-251982

[51] Int. Cl.$^5$ .......................... H04N 5/76; H04N 5/91
[52] U.S. Cl. ...................... 358/342; 358/340; 358/341; 358/343; 360/36.1
[58] Field of Search ............... 358/335, 310, 341, 342, 358/343, 315, 318, 322, 325, 328, 338, 340, 36, 37, 166, 167; 360/19.1, 36.1; H04N 5/14, 5/208, 5/213, 9/64, 5/76, 5/91, 5/95, 9/79

[56] References Cited

U.S. PATENT DOCUMENTS

| | | | |
|---|---|---|---|
| 4,558,347 | 12/1985 | Pritchard et al. | 358/166 |
| 4,750,037 | 6/1988 | Kido et al. | 358/167 |
| 5,060,078 | 10/1991 | Mitsuhashi | 358/340 |
| 5,091,788 | 2/1992 | Matsuo et al. | 358/340 |
| 5,191,487 | 3/1993 | Nakamura et al. | 358/341 |

OTHER PUBLICATIONS

Japanese Laid-Open Publication No. 61-199271.

*Primary Examiner*—Tommy P. Chin
*Assistant Examiner*—Thai Tran
*Attorney, Agent, or Firm*—Lewis H. Eslinger; Jay H. Maioli

[57] ABSTRACT

A reproducing apparatus for a video disc which detects a residual spurious component included in a reproduced video signal, and signal levels of a pair of cross carrier components are controlled and composed in accordance with the detected residual spurious components to thereby form a spurious correction signal, whereby the spurious component included in the reproduced video signal is removed.

8 Claims, 6 Drawing Sheets

F I G. 1
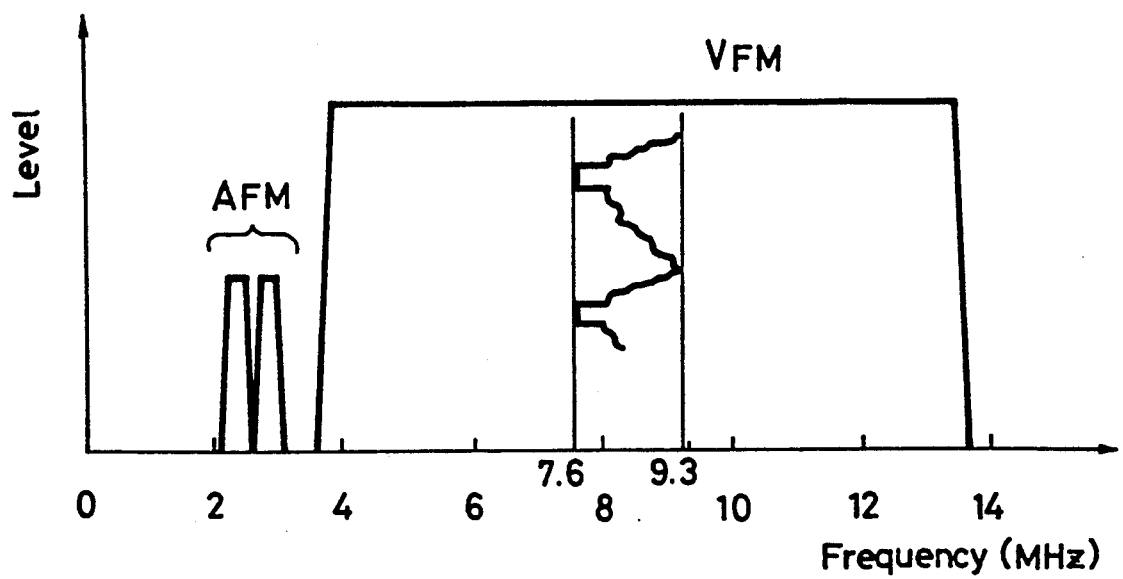

VIDEO DISC REPRODUCING APPARATUS WITH PHASE SHIFTER TO ELIMINATE INTER-MODULATION DISTORTION BETWEEN REPRODUCED AUDIO AND VIDEO SIGNALS

BACKGROUND OF THE INVENTION

1. Field of the Invention

The present invention relates to reproducing apparatus for a video disc and, more particularly, is directed to a reproducing apparatus for a video disc for eliminating spurious components included in a video signal reproduced from the video disc.

2. Description of the Prior Art

Conventionally, as shown in FIG. 1, on an optical video disc, there are recorded in frequency multiplication a frequency modulated video signal VFM having a sync-tip frequency of 7.6 MHz and a white peak frequency of 9.3 MHz, and a frequency modulated audio signal AFM of two channels (right and left channels). Carrier frequencies of the two channel frequency modulated audio signals AFM are 2.3 MHz and 2.8 MHz, respectively.

Upon recording, the frequency modulated video signal of a shorter period shown in FIG. 2A and the frequency modulated audio signal of a longer period shown in FIG. 2B are added to form a composite signal shown in FIG. 2C. The composite signal is limited in its amplitude to thereby be converted into a recording signal as shown in FIG. 2D. In the recording signal, a change in a repetition frequency thereof represents a frequency modulated component of the video signal and a change in a pulse duty factor thereof represents a frequency modulated component of the audio signal.

In the optical video disc, the frequency modulated video signal VFM and the frequency modulated audio signal AFM are recorded in frequency multiplication as set forth above. Thus, upon reproduction, due to inter-modulation of the frequency modulated video and audio signals, there are generated many spurious components including a difference mixing component and a sum mixing component between a carrier frequency fv of the frequency modulated video signal VFM and a carrier frequency fa of the frequency modulated audio signal AFM. Thus, the conventional reproducing apparatus for an optical disc has the disadvantage that beat-shaped noises appear in a reproduced image due to the spurious components of a demodulated video signal having frequency components almost equal to the carrier frequency of the frequency modulated audio signal AFM, thereby degrading quality of the reproduced video image.

One method of eliminating the spurious noises has been proposed by the same assignee of the present application in Japanese Laid-Open Publication No. 61-199271. In this method, synchronous detection is performed based on a carrier frequency component (spurious component) of a frequency modulated audio signal included in a demodulated video signal and a carrier frequency component of a reproduced frequency modulated audio signal. Then, a level of the carrier frequency component of the reproduced frequency modulated audio signal is adjusted by an output of the synchronous detection, thereby the spurious components of the demodulated video signal being eliminated.

FIG. 4 shows an arrangement of the conventional reproducing apparatus for a video disc shown in the above-described publication.

Referring to FIG. 4, a reproduced radio frequency (RF) signal is outputted from an optical pickup (PU) 1 positioned in opposition to a video disc D, and then supplied to a video signal demodulator 12 through a band pass filter (BPF) 11 having a center frequency fv. Also, the reproduced RF signal is supplied to a pair of audio signal demodulators 15 and 16 through a pair of band pass filters 13 and 14 having center frequencies fa1 and fa2, respectively. Thus, an audio signal and a video signal are reproduced by the demodulators 15, 16 and 12, respectively. An output of the video signal demodulator 12 is, on one hand, supplied to an adder 19 through a low pass filter (LPF) 17 and a delay circuit 18 having a delay time T.

The output signal of the video signal demodulator 12 is, on the other hand, supplied to spurious correction circuits 20 and 30. In the spurious correction circuit 20, the output signal of the video signal demodulator 12 is supplied to a synchronous detection circuit 21 through a band pass filter 22 having a center frequency fa1. Also, a reproduced audio signal Sa1 is supplied from the band pass filter 13 to the synchronous detection circuit 21 through a delay circuit 23 having a delay time Ta1.

An output signal of the delay circuit 23 is also supplied to a level adjusting circuit 24. An output signal of the synchronous detection circuit 21 is supplied through a low pass filter 25 to the level detection circuit 24, which thereby controls an output signal level of the delay circuit 23. The signal thus adjusted in its signal level by the level adjusting circuit 24 is supplied to the adder 19 through a phase conversion circuit 26.

In the other spurious correction circuit 30, in the same manner as the spurious correction circuit 20, the output signal of the video signal demodulator 12 is supplied to a synchronous detection circuit 31 through a band pass filter 32 having a center frequency fa2. An output signal of the synchronous detection circuit 31 is supplied to a level adjusting circuit 34 through a low pass filter 35. The reproduced audio signal is supplied to a delay circuit 33 having a delay time Ta2 from the band pass filter 14. An output signal of the delay circuit 33 is supplied to the synchronous detection circuit 31 to perform the synchronous detection, and also supplied to the level adjusting circuit 34, which in turn controls an output signal level of the delay circuit 33 in accordance with an output of the low pass filter 35. An output signal of the level adjusting circuit 34 is supplied to the adder 19 through a phase inversion circuit 36.

In the synchronous detection circuits 21 and 31 of the spurious correction circuits 20 and 30, spurious components Ss1 and Ss2 having center frequencies fa1 and fa2 which are separated from the demodulated video signal are multiplied by audio carrier components Sa1 and Sa2 which are made in phase with the spurious components Ss1 and Ss2 by the delay circuits 23 and 33, respectively. Thus, the synchronous detection circuits 21 and 31 deliver detection signals Sd1 and Sd2 accorded with the spurious components Ss1 and Ss2, respectively.

Signal levels of the audio carrier components Sa1 and Sa2 are adjusted in accordance with the detection signals Sd1 and Sd2 by the level adjusting circuits 24 and 34, respectively. Thus, the level adjusting circuits 24 and 34 deliver correction signals Sc1 and Sc2 accorded with signal levels of the spurious components Ss1 and Ss2, respectively.

The correction signals Sc1 and Sc2 are inverted in their phases by the phase inversion circuits 26 and 36 and then supplied to the adder 19, respectively, whereby the spurious components Ss1 and Ss2 included in the demodulated video signal are eliminated in the adder 19.

In the thus constituted conventional reproducing apparatus for a video disc, since the spurious correction circuits 20 and 30 employ synchronous detection circuits 21 and 31, it is required to coincide the phases of the audio carrier components Sa1 and Sa2 for the synchronous detection with those of the spurious components Ss1 and Ss2 by using the delay circuits 23 and 33, respectively.

However, since the spurious component of the demodulated video signal differs at every disc, the conventional reproducing apparatus for a video disc has the disadvantage such that the delay times Ta1 and Ta2 of the spurious correction circuits 20 and 30 must be adjusted at every disc, respectively.

OBJECTS AND SUMMARY OF THE INVENTION

It is an object of the present invention to provide an improved reproducing apparatus for a video disc in which the aforementioned shortcomings and disadvantages encountered with the prior art can be eliminated.

More specifically, it is an object of the present invention to provide a reproducing apparatus for a video disc which can suppress spurious component of a demodulated video signal to provide a good reproduced image without adjusting delay times of delay circuits.

According to the first aspect of the present invention, a reproducing apparatus for a video disc is provided in which, in a case of reproducing and demodulating a frequency modulated video signal and a frequency modulated audio signal recorded on a disc in frequency multiplication, an inter-modulation distortion component included in a reproduced video signal is detected in accordance with the reproduced frequency modulated audio signal, and the inter-modulation distortion component is cancelled in accordance with the reproduced frequency modulated audio signal which signal level is controlled in accordance with the detected inter-modulation distortion. The reproducing apparatus includes a phase shifting circuit for shifting a phase of the reproduced frequency modulated audio signal by a predetermined angle, e.g., −90 degrees, and first and second multipliers to each of which the inter-modulation distortion component is applied. The reproduced frequency modulated audio signal is supplied to the first multiplier and an output of the phase shifting circuit is supplied to the second multiplier, whereby the inter-modulation distortion component is dissolved into two components to thereby obtain two dissolved detection signals. Signal levels of the reproduced frequency modulated audio signal and the the output of the phase shifting circuit are controlled in accordance with the dissolved detection signals, respectively, and then composed to thereby remove the inter-modulation distortion component included in the reproduced video signal.

According to the second aspect of the present invention, a reproducing apparatus for a video disc is provided in which a frequency modulated video signal and a frequency modulated audio signal recorded on a disc in frequency multiplication are reproduced and demodulated, and an inter-modulation distortion component included in a reproduced video signal is detected in accordance with the reproduced frequency modulated audio signal, and then the inter-modulation distortion component is removed in accordance with the reproduced frequency modulated audio signal which signal level is controlled in accordance with the detected inter-modulation distortion. The reproducing apparatus includes a first phase shifting circuit for shifting a phase of the reproduced frequency modulated audio signal by a predetermined angle, e.g., −90 degrees, first and second multipliers to which an output of the first phase shifting circuit and the reproduced frequency modulated signal audio are applied, respectively, a second phase shifting circuit commonly connected to the first and second multipliers, and a switch for changing an input signal applied to the second phase shifter. In a state where the output of the first phase shifting circuit is supplied to the second phase shifting circuit through the switch, a phase difference between the output of the second phase shifting circuit and the reproduced frequency modulated audio signal is detected and then an amount of phase shift of the second phase shifting circuit is controlled in accordance with the detected phase difference. In contrast, in a normal state where the inter-modulation distortion component is supplied to the second phase shifting circuit through the switch, the inter-modulation distortion component is dissolved into two components having a predetermined angle therebetween, thereby obtaining two dissolved detection signals. Then, signal levels of the reproduced frequency modulated audio signal and the the output of the first phase shifting circuit are controlled in accordance with the dissolved detection signals, respectively, and then composed to thereby remove the inter-modulation distortion component included in the reproduced video signal. According to the thus constituted reproducing apparatus for a video disc, the spurious component included in the demodulated video signal can be removed without adjusting circuit constants of the apparatus at every disc.

The preceding and other objects, features, and advantages of the present invention will become apparent from the following detailed description of illustrative embodiments thereof when read in conjunction with the accompanying drawings, in which like reference numerals are used to identify the same or similar parts in the several views.

BRIEF DESCRIPTION OF THE DRAWINGS

FIG. 1 shows a frequency spectrum of a reproduced signal of a video disc;

DETAILED DESCRIPTION OF THE PREFERRED EMBODIMENTS

A reproducing apparatus for a video disc according to a first embodiment of the present invention will hereinafter be described with reference to FIG. 5.

Figure 2A:
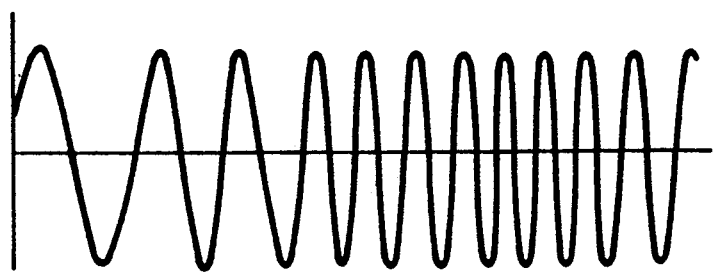
FIGS. 2A to 2D show waveform diagrams used to explain a signal recorded on a video disc.
Figure 2B:
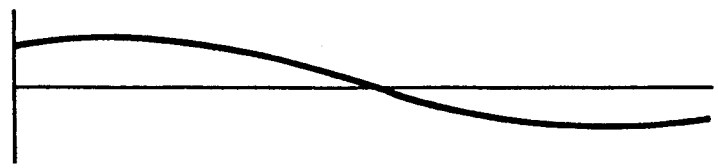
Figure 2C:
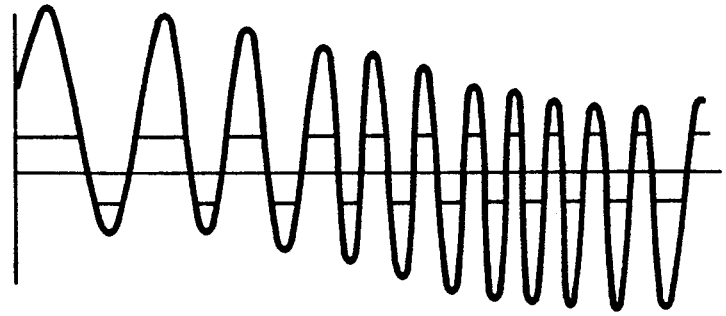
Figure 2D:
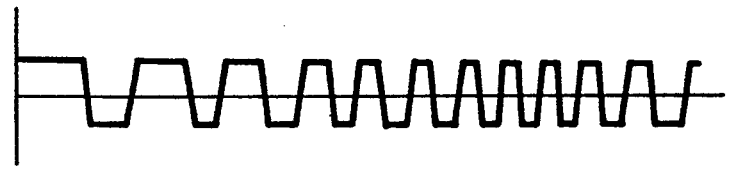
Figure 3:
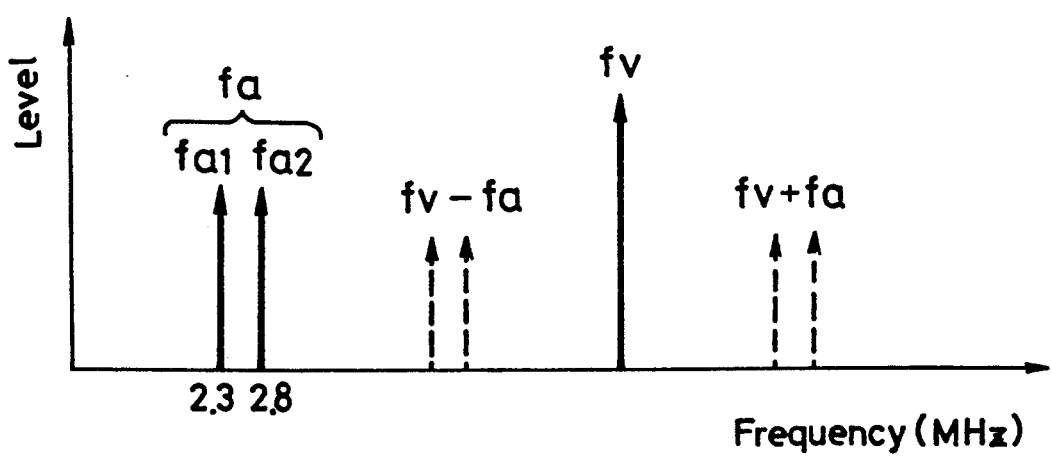
FIG. 3 shows a frequency spectrum of spurious signals included in a reproduced signal of a video disc.
Figure 4:
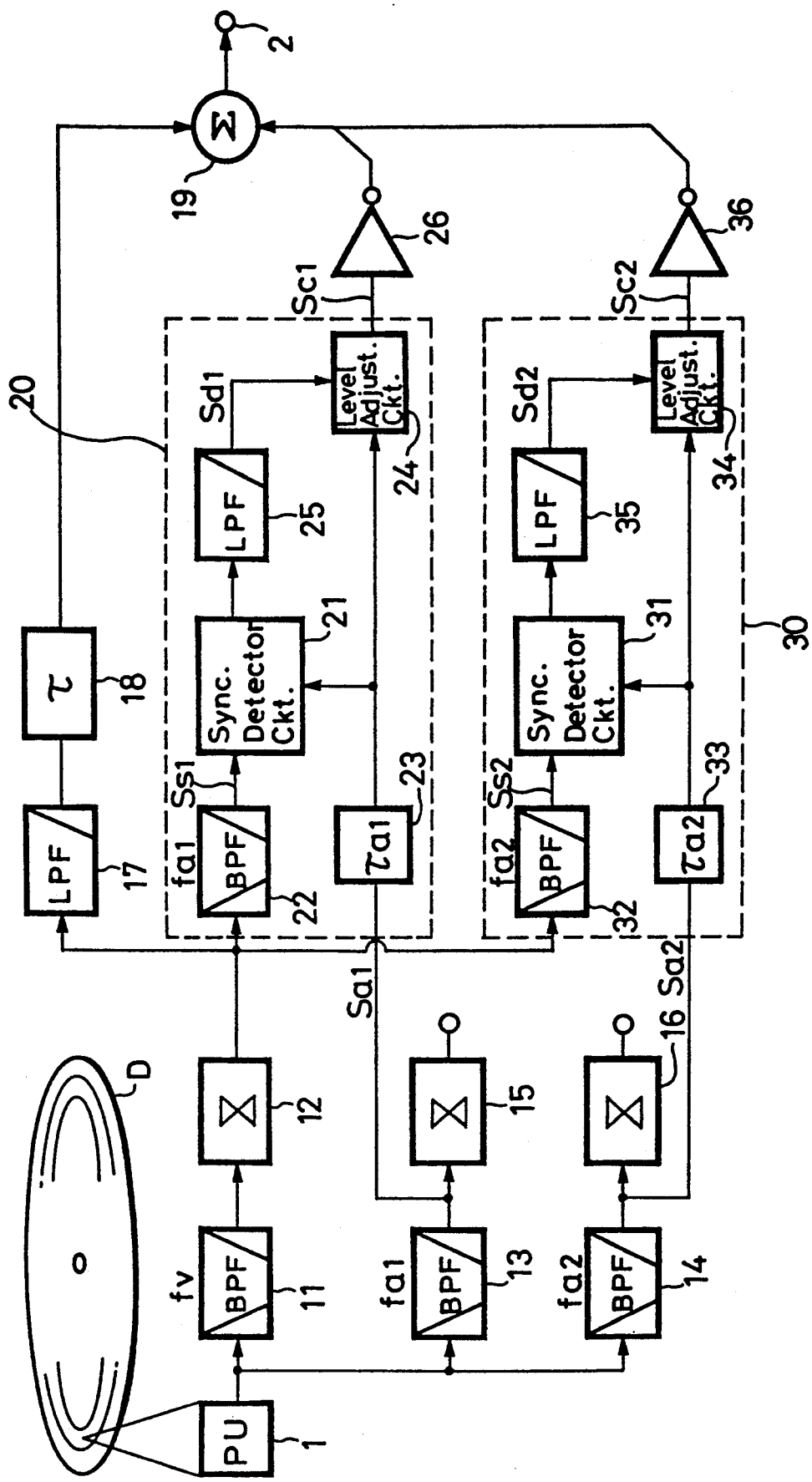
FIG. 4 shows in block form an arrangement of a conventional reproducing apparatus for a video disc having spurious correction circuits.
Figure 5:
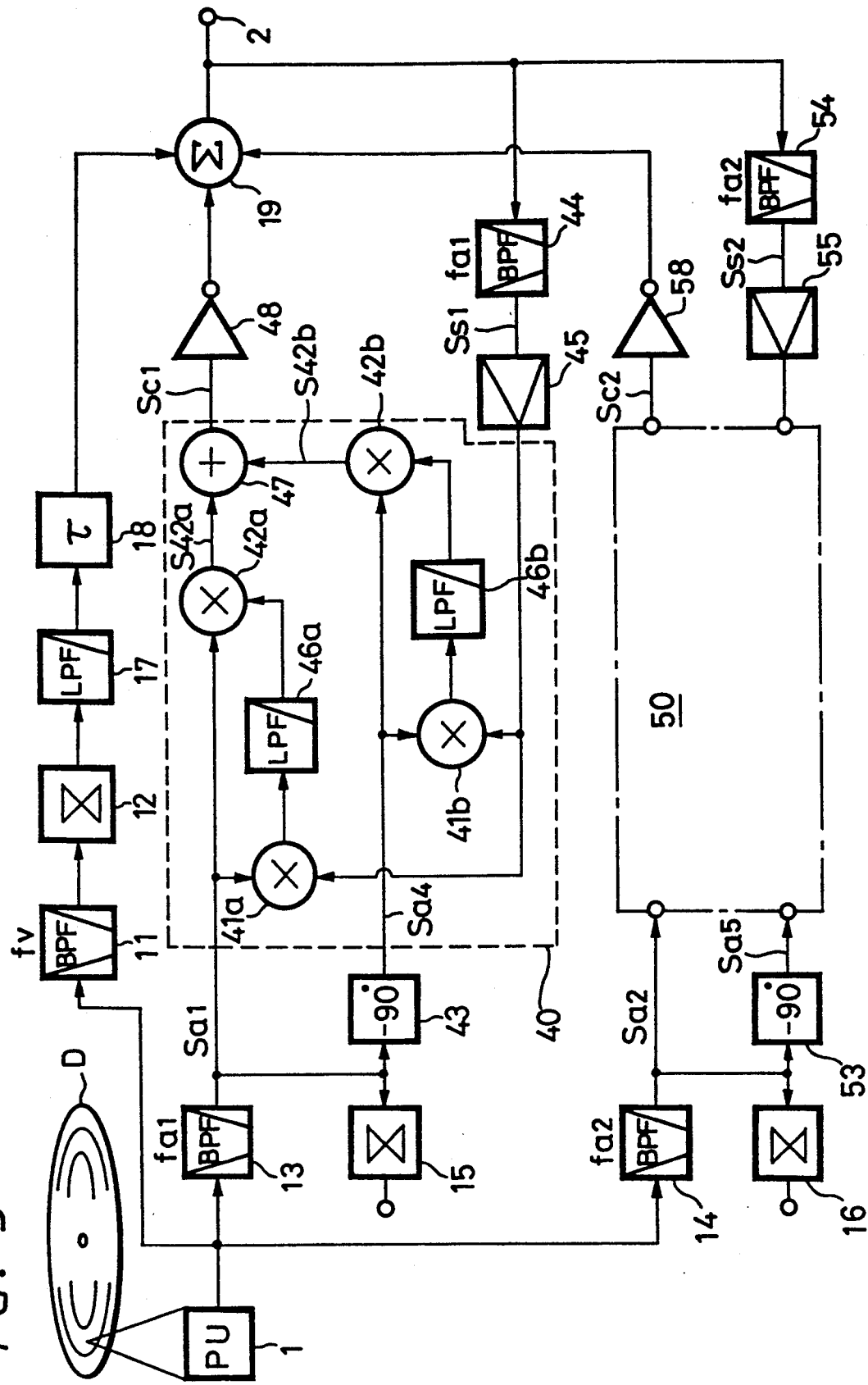
FIG. 5 shows in block form an arrangement of a reproducing apparatus for a video disc according to a first embodiment of the present invention.

FIG. 5 shows in block form an arrangement of the reproducing apparatus for a video disc according to the first embodiment of the present invention. In FIG. 5, like parts corresponding to these of FIG. 4 are marked with the same references and therefore need not be described.

Referring to FIG. 5, a spurious correction circuit 40 for one channel includes a pair of multipliers 41a and 41b in place of the synchronous detection circuit 21 or 31 of FIG. 4. Further, the spurious correction circuit 40 includes another pair of multipliers 42a and 42b in place of the level adjusting circuit 24 or 34 of FIG. 4. An audio carrier component Sa1 from a band pass filter 13 is supplied to a set of the multipliers 41a and 42a, and also supplied to another set of the multipliers 41b and 42b as a signal Sa4 after having been fed through a phase shifter 43 for shifting the phase of the audio carrier component Sa1 by −90 degrees. A demodulated video signal delivered from an adder 19 is supplied to a band pass filter 44 having a center frequency fa1 to thereby extract a residual spurious component Ss1. The residual spurious component Ss1 is supplied to the multipliers 41a and 41b through an amplifier 45 having a gain of about 20 dB, for example. Outputs of the multipliers 41a and 41b are supplied to the multipliers 42a and 42b through capacitors 46a and 46b constituting low pass filters, respectively.

Outputs of the multipliers 42a and 42b are composed by an adder 47 to form a correction signal Sc1, which in turn is supplied to the adder 19 through a phase inversion circuit 48

A spurious correction circuit 50 for the other channel has the same arrangement as that of the spurious correction circuit 40. That is, an audio carrier component Sa2 from a band pass filter 14 is supplied to a pair of multipliers, and also supplied to the other pair of multiplier as a signal Sa5 through a phase shifter 53 for shifting the phase of the audio carrier component Sa1 by −90 degrees. The output signal of the adder 19 is supplied to a band pass filter 54 having a center frequency fa2 to thereby extract a residual spurious component Ss2. The residual spurious component Ss2 is supplied to an amplifier 55. A correction signal Sc2 formed by the spurious correction circuit 50 is supplied to the adder 19 through a phase inversion circuit 58.

Operation of the first embodiment of the present invention shown in FIG. 5 will be described below. As to the spurious correction circuit 40, the phase shifter 43 forms a cross carrier component Sa4 which phase differs from that of the audio carrier component Sa1 by 90 degree, and the cross carrier component Sa4 and the audio carrier component Sa1 are supplied to the pair of multipliers 41b and 41a, respectively, thereby being multiplied by the spurious component Ss1. Thus, the spurious component Ss1 is dissolved in accordance with the phases of the carrier components Sa1 and Sa4 by the multipliers 41a and 41b to thereby obtain two detection signals, respectively.

The detected outputs of the multipliers 41a and 41b are multiplied by the carrier components Sa1 and Sa4 in the multipliers 42a and 42b, respectively, so that the signal levels of the carrier components Sa1 and Sa4 are controlled in accordance with the spurious component Ss1. Carrier components S42a and S42b which signal levels are respectively thus controlled by the multipliers 42a and 42b are supplied to the adder 47, which in turn composes vector components of the carrier components S42a and S42b to thereby form the correction signal Sc1. An amount of phase shift of the phase shifter 43 is preferably 90 degrees, but it is not limited to 90 degrees.

Similarly, the audio carrier component Sa2 is supplied to the phase shifter 53, which in turn forms a cross carrier component Sa5 which phase differs from that of the audio carrier component Sa2 by 90 degree. In the spurious correction circuit 50, the spurious component Ss2 is dissolved in accordance with the carrier components Sa2 and Sa5 to thereby obtain two dissolved detection signals, respectively.

The signal levels of the carrier components Sa2 and Sa5 are controlled in accordance with the two dissolved detection signals, respectively, and then vector components of the carrier components which signal levels are respectively thus controlled are composed to thereby form the correction signal Sc2.

The correction signals Sc1 and Sc2 are respectively inverted in their phases by the phase inversion circuits 48 and 58 and then supplied to the adder 19, whereby the spurious components Ss1 and Ss2 of the demodulated video signal are suppressed. Thus, beat-shaped noises appeared in a reproduced image due to the spurious components of demodulated video signal become inconspicuous, and so the quality of a reproduced video image can be maintained preferably.

As described above, in accordance with the first embodiment, a pair of the carrier components which whose phases differ by 90 degrees with each other are formed from the audio carrier component Sa1 (Sa2), and the residual spurious component Ss1 (Ss2) is dissolved in accordance with the pair of the carrier components to form the dissolved detection signals, respectively. Then, the vector components of the carrier components whose signal levels are respectively controlled in accordance with the dissolved detection signals are composed to thereby form the correction signal Sc1 (Sc2).

Therefore, the correction signals Sc1 and Sc2 become in phase with the corresponding residual spurious components Ss1 and Ss2, respectively, so that there is no necessity of making the phases of the audio carrier components coincide with those of the spurious components like the prior art shown in FIG. 4.

Further, the pair of the carrier components whose phases differ by 90 degrees with each other are formed from the audio carrier component, and the residual spurious component is dissolved in accordance with the pair of the carrier components to form the dissolved detection signals, respectively. Then, the vector components of the carrier components whose signal levels are respectively controlled in accordance with the dissolved detection signals are composed to thereby form the correction signal. Thus, the spurious components of the demodulated video signal can be sufficiently suppressed without adjusting circuit elements of the apparatus at every disc.

A reproducing apparatus for a video disc according to a second embodiment will hereinafter be described with reference to FIG. 6.

Figure 6:
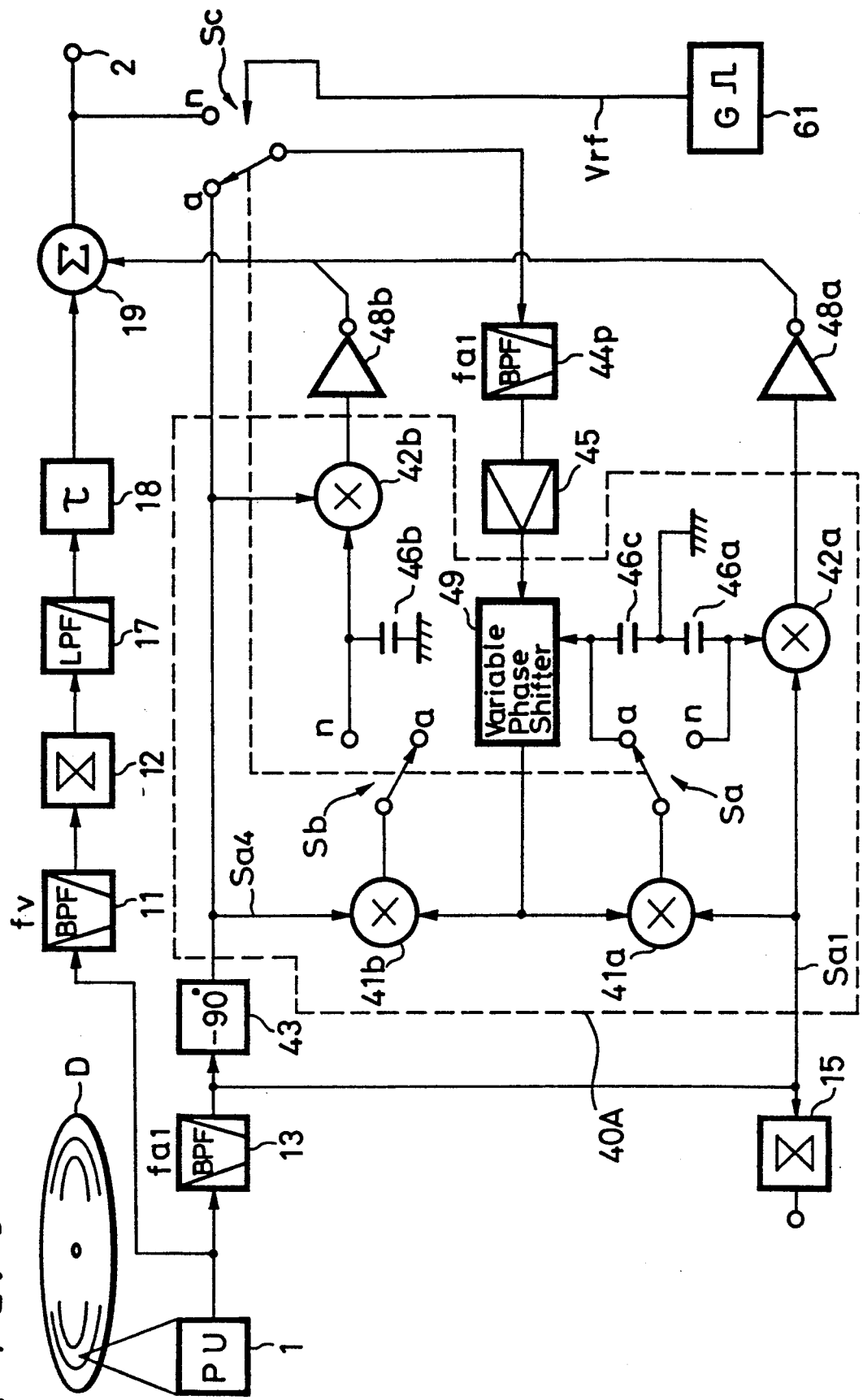
FIG. 6 shows in block form an arrangement of the reproducing apparatus for a video disc according to a second embodiment of the present invention.

FIG. 6 shows in block form an arrangement of the reproducing apparatus for a video disc according to the second embodiment, in which a circuit arrangement of only one audio channel is shown and that of the other audio channel is not shown since the latter has the same configuration as the former. In FIG. 6, like parts corresponding to these of FIG. 5 are marked with the same references and therefore need not be described.

Referring to FIG. 6, a spurious correction circuit 40A for one channel includes two pairs of multipliers 41a, 41b and 42a, 42b like the first embodiment of FIG. 5.

In this embodiment, a variable phase shifter 49 is provided between an amplifier 45 and the pair of multipliers 41a and 41b.

The outputs of the multipliers 41a and 41b and the input of a band pass filter 44p having a center frequency fa1 are connected to switches Sa, Sb and Sc, respectively. These switches Sa, Sb and Sc are synchronously changed over in response to a vertical sync. signal Vrf serving as a reference signal supplied from a pulse generating circuit 61.

The output signals of the multipliers 41a and 41b are supplied to the multipliers 42a and 42b through fixed contacts n of the switches Sa and Sb, respectively. The fixed contacts n of the switches Sa and Sb are grounded through capacitors 46a and 46b, respectively. The output of the multiplier 41a is connected to the variable phase shifter 49 through a fixed contact a of the switch Sa and further grounded through the fixed contact a of the switch Sa and a capacitor 46c serving as a low pass filter. A fixed contact a of the switch Sb is always opened. Outputs of the multipliers 42a and 42b are supplied to an adder 19 through phase inversion circuits 48a and 48b, respectively.

The band pass filter 44p is supplied with the output of the adder 19 through a fixed contact n of the switch Sc or the output of a phase shifter 43 for shifting the phase of the audio carrier component by −90 degrees through a fixed contact a of the switch Sc.

Though not shown, a spurious correction circuit for the other channel (not shown) corresponding to the spurious component Ss2 having a center frequency fa2 has the same arrangement as that of the spurious correction circuit 40A.

Operation of the second embodiment shown in FIG. 6 will be explained below.

When each of the switches Sa to Sc is changed over to the fixed contact a thereof in response to the reference vertical sync. signal Vrf supplied from the pulse generating circuit 61 during the vertical blanking period, the spurious correction circuit 40A is placed in an adjusting mode. In contrast, when each of the switches Sa to Sc is changed over to the fixed contact n thereof, the spurious correction circuit 40A is placed in a normal mode to remove the spurious component from the demodulated video signal.

In the adjusting mode, the cross carrier component Sa4 from the phase shifter 43 is supplied to the variable phase shifter 49 through the band pass filter 44p and the amplifier 45. The output of the variable phase shifter 49 is supplied to the multiplier 41a and so multiplied by the audio carrier component Sa1 supplied from the band pass filter 13, whereby the phase comparison is performed between the carrier components Sa1 and Sa4. When there is a phase difference between the cross carrier component Sa4 and the audio carrier component Sa1, a positive or negative voltage is outputted from the multiplier 41a to charge the capacitor 46c, thereby controlling an amount of phase shift of the variable phase shifter 49.

Thus, a phase difference between the input side of the band pass filter 44p and the output side of the variable phase shifter 49 is automatically adjusted. Then, when the switches Sa to Sc are changed over to the fixed contacts n, the spurious component is removed from the demodulated video signal.

Therefore, according to the second embodiment, even if the frequency characteristic of the band pass filter 44p is deviated from a normalized value due to variations of adjustment of circuit constants or change of ambient temperature and so on, the deviation of the frequency characteristic can be automatically compensated. Thus, the second embodiment can remove the spurious component of the demodulated video signal like the first embodiment.

Having described the preferred embodiments of the present invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A reproducing apparats for a video disc in which a frequency modulated video signal and a frequency modulated audio signal recorded on a disc in frequency multiplication are reproduced and demodulated, and in which an inter-modulation distortion component is present in a reproduced video signal, said reproducing apparatus comprising:

a phase shifting circuit for shifting a phase of a reproduced frequency modulated audio signal by a predetermined amount;

a first multiplier for receiving an inter-modulation distortion component present in a reproduced video signal and the reproduced frequency modulated audio signal;

a second multiplier for receiving the inter-modulation distortion component present in the reproduced video signal and an output of said phase shifting circuit;

first means for controlling a signal level of the reproduced frequency modulated audio signal in accordance with an output of said first multiplier;

second means for controlling a signal level of the output of said phase shifting circuit in accordance with an output of said second multiplier; and adding means for adding outputs of said first and second means to the reproduced video signal to produce an output signal.

2. A reproducing apparatus for a video disc according to claim 1, wherein said first or second means is constituted by a multiplier.

3. A reproducing apparatus for a video disc according to claim 1, wherein said adding means includes means for inverting a phase of a sum of the outputs of said first and second means fed thereto.

4. A reproducing apparatus for a video disc according to claim 1, wherein said phase shifting circuit produces a phase shift of 90 degrees.

5. A reproducing apparats for a video disc in which a frequency modulated video signal and a frequency modulated audio signal recorded on a disc in frequency multiplication are reproduced and demodulated, and in which an inter-modulation distortion component is present in a reproduced video signal, said reproducing apparatus comprising:

a first phase shifting circuit for shifting a phase of a reproduced frequency modulated audio signal by a predetermined amount;

a second phase shifting circuit which receives an output of said first phase shifting circuit or a reproduced video signal for shifting a phase of the received signal;

a first multiplier for receiving outputs of said first and second phase shifting circuits;

a second multiplier for multiplying the output of said second phase shifting circuit by the reproduced frequency modulated audio signal;

first means for controlling a signal level of the output signal of said first phase shifting circuit in accordance with an output of said first multiplier;

second means for controlling a signal level of the reproduced frequency modulated audio signal in accordance with an output of said second multiplier;

adding means for adding outputs of said first and second means to the reproduced video signal; and signal change-over means for supplying the outputs of said first and second multipliers to said first and second means, respectively, when supplying the reproduced video signal to said second phase shifting circuit, and for supplying the output of said second multiplier to said second phase shifting circuit to control a phase shift thereof when supplying the output of said first phase shifting circuit to said second phase shifting circuit, whereby the phase shift of said second phase shifting circuit is controlled in response to the reproduced video signal, so that an output of said adding means is the reproduced video signal with the inter-modulation distortion component removed therefrom.

6. A reproducing apparatus for a video disc according to claim 5, wherein said first or second means is constituted by a multiplier.

7. A reproducing apparatus for a video disc according to claim 5, wherein said adding means includes means for inverting a phase of a sum of the outputs of said first and second means fed thereto.

8. A reproducing apparatus for a video disc according to claim 5, wherein said first phase shifting circuit produces a phase shift of 90 degrees.

* * * * *

UNITED STATES PATENT AND TRADEMARK OFFICE
CERTIFICATE OF CORRECTION

PATENT NO. : 5,294,995
DATED : March 15, 1994
INVENTOR(S) : Noriyuki Yamashita

It is certified that error appears in the above-indentified patent and that said Letters Patent is hereby corrected as shown below:

Col. 5, line 37, after "48" insert --.--

Col. 8, line 25, change "apparats" to --apparatus--
       line 62, change "apparats" to --apparatus--

Signed and Sealed this

Thirty-first Day of October 1995

Attest:

BRUCE LEHMAN

Attesting Officer

Commissioner of Patents and Trademarks